(12) United States Patent
Lee

(10) Patent No.: US 11,347,233 B2
(45) Date of Patent: *May 31, 2022

(54) VEHICLE CONTROL APPARATUS, VEHICLE CONTROL SYSTEM, AND IMAGE SENSOR

(71) Applicant: MANDO CORPORATION, Pyeongtaek-si (KR)

(72) Inventor: Sang Yeob Lee, Seongnam-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 310 days.

This patent is subject to a terminal disclaimer.

(21) Appl. No.: 16/594,601

(22) Filed: Oct. 7, 2019

(65) Prior Publication Data

US 2020/0110418 A1 Apr. 9, 2020

(30) Foreign Application Priority Data

Oct. 8, 2018 (KR) .......................... 10-2018-0120085

(51) Int. Cl.
*G05D 1/02* (2020.01)
*B60R 11/04* (2006.01)
(Continued)

(52) U.S. Cl.
CPC .............. *G05D 1/0246* (2013.01); *B60T 7/22* (2013.01); *B60T 8/17* (2013.01);
(Continued)

(58) Field of Classification Search
CPC .............. G05D 1/0223; G05D 1/0246; G05D 2201/0212; G05D 2201/0213;
(Continued)

(56) References Cited

U.S. PATENT DOCUMENTS

2002/0183906 A1* 12/2002 Ikeda ...................... G01S 17/42
   348/148
2016/0161271 A1* 6/2016 Okumura ............... G01C 21/34
   701/25

(Continued)

FOREIGN PATENT DOCUMENTS

JP 8-306000 A 11/1996
KR 10-2017-0058716 A 5/2017
KR 10-2018-0039900 A 4/2018

*Primary Examiner* — Nga X Nguyen
(74) *Attorney, Agent, or Firm* — Morgan, Lewis & Bockius LLP

(57) ABSTRACT

Disclosed herein is a vehicle control apparatus, vehicle control system and image sensor. The vehicle control apparatus includes a first sensor configured to be disposed on the vehicle to have a view to the outside of the vehicle and capture image data and a controller configured to include at least one processor to process the image data captured by the first sensor, wherein the controller recognizes a roundabout based on the processing result of the image data, sets a region of interest in front of the vehicle based on a state information of the roundabout obtained from the processing result of the image data, determines a target located in the region of interest based on information of the target location based on the processing result of the image data, and controls the vehicle based on the information of the target location in the region of interest. According to the embodiment of the disclosed invention, the vehicle may enter a roundabout safely.

19 Claims, 11 Drawing Sheets

(51) Int. Cl.
    *G06K 9/00*      (2022.01)
    *G06T 7/70*      (2017.01)
    *G06K 9/62*      (2022.01)
    *G06T 7/13*      (2017.01)
    *B60W 30/18*      (2012.01)
    *B60T 8/17*      (2006.01)
    *B60T 7/22*      (2006.01)
    *G08G 1/16*      (2006.01)
    *G06V 20/56*      (2022.01)

(52) U.S. Cl.
    CPC ..... *B60W 30/18145* (2013.01); *G05D 1/0214* (2013.01); *G06T 7/13* (2017.01); *G06V 20/588* (2022.01); *G08G 1/166* (2013.01); *B60W 2552/05* (2020.02); *B60W 2556/50* (2020.02); *G06T 2207/30256* (2013.01)

(58) Field of Classification Search
    CPC .. G05D 1/0214; B60R 11/04; G06K 9/00798; G06K 9/6261; G06K 9/00805; G06K 2209/21; G06K 2209/23; G06K 9/3233; G06K 9/00818; G06K 9/00791; G06T 7/70; G06T 2207/30261; G06T 2207/30236; G06T 7/13; G06T 2207/30256; H04N 5/2253; B60T 8/17; B60T 7/22; B60T 2210/36; B60T 2210/32; B60T 2201/022; G08G 1/166; G08G 1/167; B60W 30/18145; B60W 2552/05; B60W 2556/50; B60W 30/18159; B60W 30/18009; B60W 2552/30; B60W 2552/00; B60W 2420/42; B60W 30/18154; B60W 30/08; B60W 40/02; B60W 10/18; G06V 20/588; G06V 10/25; G06V 20/58; G06V 20/582; G06V 20/56

See application file for complete search history.

(56) References Cited

U.S. PATENT DOCUMENTS

2016/0280266 A1*    9/2016    Kawamata  ........ B62D 15/0265
2019/0204841 A1*    7/2019    Luo  .................... G05D 1/0214

* cited by examiner

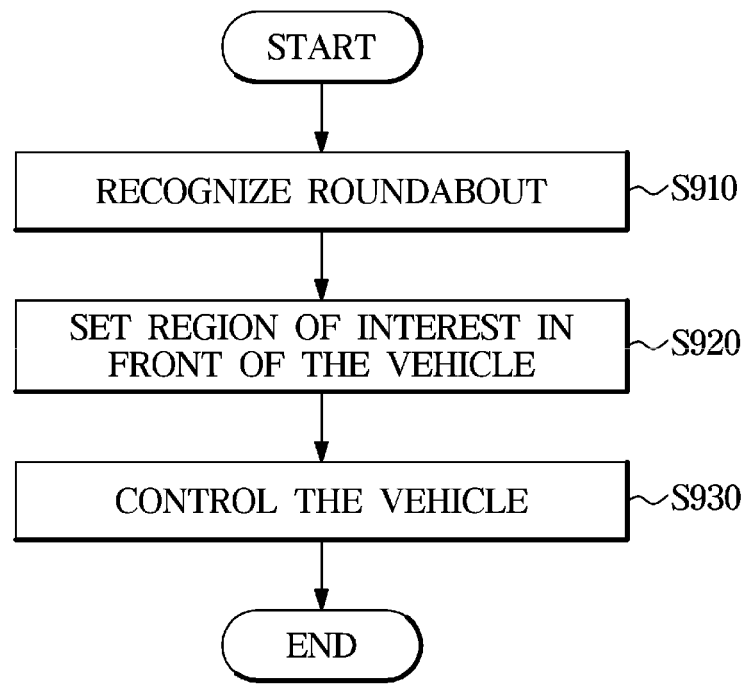

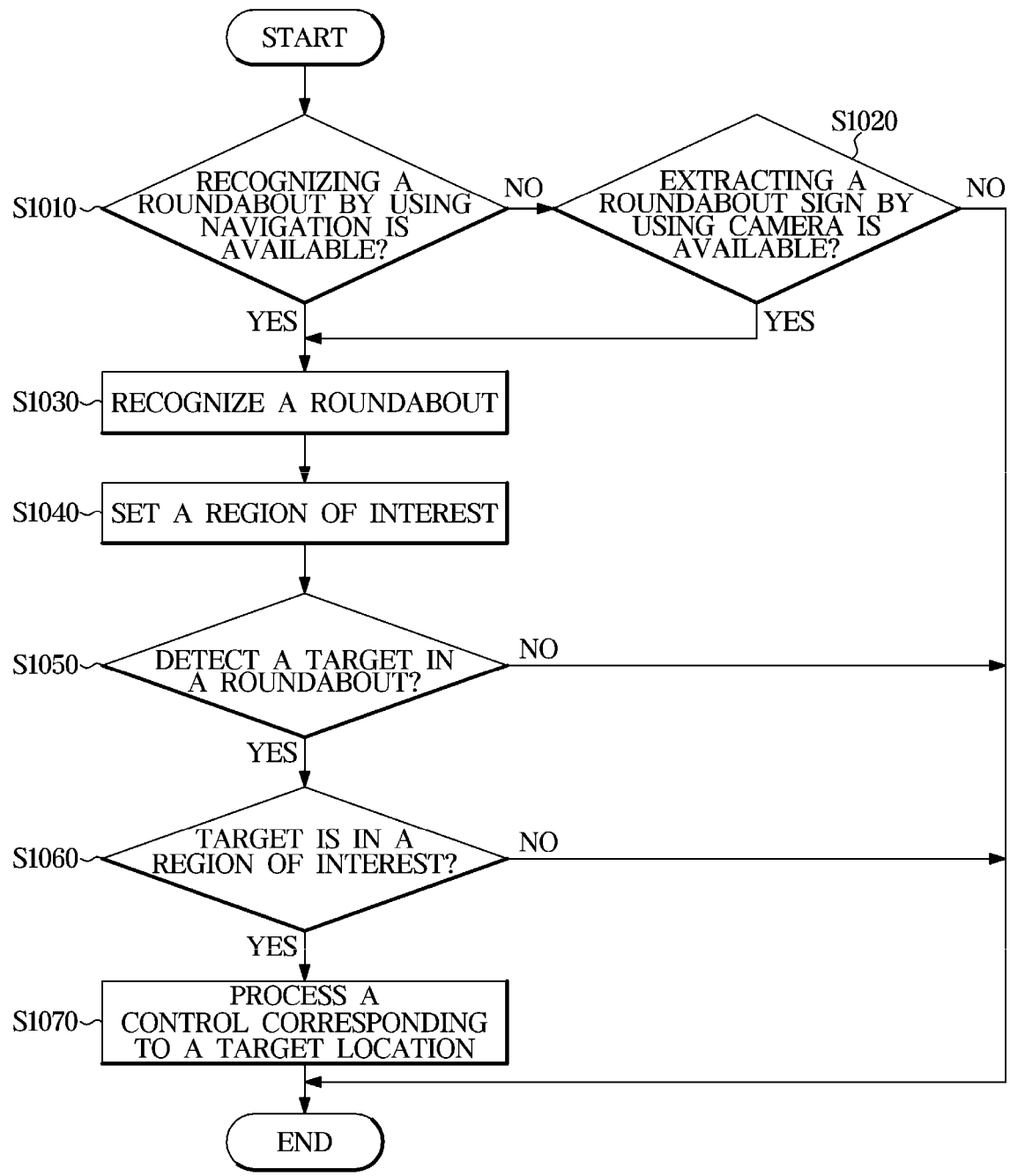

VEHICLE CONTROL APPARATUS, VEHICLE CONTROL SYSTEM, AND IMAGE SENSOR

CROSS-REFERENCE TO RELATED APPLICATION(S)

This application is based on and claims priority under 35 U.S.C. § 119 to Korean Patent Application No. 10-2018-0120085, filed on Oct. 8, 2018 in the Korean Intellectual Property Office, the disclosure of which is incorporated by reference in its entirety.

BACKGROUND

1. Technical Field

Embodiments of the present disclosure relate to a vehicle control apparatus and vehicle control method and vehicle control system.

2. Description of the Related Art

Recently, intersections with traffic lights have been recognized as roads causing energy waste and environmental pollution due to vehicle idling, and a turning intersection or roundabout has been introduced to replace them.

A roundabout is a road that puts a traffic island in the center so that vehicles can drive around it. Because there is no structure that organizes traffic such as traffic lights, traffic can be crowded at roundabouts. In addition, the driver is difficult to enter the roundabout because the naked eye must grasp the traffic conditions of the roundabout and drive.

Therefore, there is a demand for a technology that recognizes roundabout, detects another vehicle driving in roundabout, and allows the vehicle to safely enter roundabout.

SUMMARY

In view of the above, it is an aspect of the present disclosure to provide a vehicle control device, a vehicle control method, and a vehicle control system that safely enters roundabout by minimizing the collision possibility between vehicles in roundabout.

Another object of the present disclosure is to provide a vehicle control device, a vehicle control method, and a vehicle control system which facilitate driving by maintaining traffic in roundabout smoothly.

In accordance with an aspect of the present disclosure, a vehicle control apparatus includes a first sensor configured to be disposed on the vehicle to have a view to the outside of the vehicle and capture image data; and a controller configured to include at least one processor to process the image data captured by the first sensor, wherein the controller recognizes a roundabout based on the processing result of the image data, sets a region of interest in front of the vehicle based on a state information of the roundabout obtained from the processing result of the image data, determines a target located in the region of interest based on information of the target location based on the processing result of the image data, and controls the vehicle based on the information of the target location in the region of interest.

The controller may form an outermost boundary based on the state information of the roundabout, and sets the region of interest having a range from the vehicle to the outermost boundary.

The state information of the roundabout may be perimeter information of the roundabout, and the controller may form the outermost boundary having an arc length as the perimeter of the roundabout from the perimeter information of the roundabout.

The controller may analyze a trace of the information of the target location by combining the information of the target location, and may form the outermost boundary from a center of the vehicle toward the left with respect to the front-side of the vehicle based on the moving direction of the trace, or from the center of the vehicle toward the right with respect to the front-side of the vehicle based on the moving direction of the trace.

The controller may set the region of interest by dividing a range from the vehicle to the outermost boundary into two or more zones according to a distance, and may perform a preset vehicle control for each of the two or more zones by determining which of the two or more zones the target is located.

The vehicle control apparatus further includes a second sensor configured to be disposed on the vehicle to have a detection area for the outside of the vehicle, and wherein the controller may further obtain the information of the target location based on the sensing data of the second sensor.

The controller may receive a surrounding environment information at the location of the vehicle from a navigation, and recognizes the roundabout by extracting an information of the roundabout included in the surrounding environment information, and may recognize the roundabout by receiving the image data and using the roundabout image by processing the image data when the roundabout is not recognizable from the surrounding environment information.

The controller may extract the perimeter information of the roundabout from the roundabout information and forms the outermost boundary having a perimeter as an arc length.

The controller forms the outermost boundary having a pre-set average perimeter as an arc length by extracting the pre-set average perimeter information of the roundabout when the roundabout is not recognizable from the surrounding environment information of the navigation.

The controller may form the outermost boundary from a center of the vehicle toward the left with respect to the front-side of the vehicle based on the location information of the vehicle received from the navigation, or from the center of the vehicle toward the right with respect to the front-side of the vehicle based on the location information of the vehicle received from the navigation The controller may set the control intensity higher as the zone approaches to the vehicle.

The controller may perform at least one of a deceleration control for decelerating the vehicle and a braking control for braking the vehicle when the roundabout is recognized.

The controller may control a behavior of the vehicle to enter the roundabout when the target has escaped the region of interest.

In accordance with another aspect of the present disclosure, a vehicle control system includes a first sensor configured to be disposed on the vehicle to have a view to the outside of the vehicle and capture image data; an emergency braking module configured to control the braking device based on a degree of a collision possibility with a target and the vehicle; and an integrated controller processes the image data captured by the first sensor, determines the degree of the collision possibility with the target located on the roundabout, generates and outputs the information of the degree of the collision possibility, wherein the integrated controller recognizes a roundabout based on the processing result of the image data, sets a region of interest in front of the vehicle based on a state information of the roundabout obtained from the processing result of the image data, determines a target located in the region of interest based on information of the target location based on the processing result of the image data, and determines the degree of the collision possibility with the vehicle and the target based on the location information of the target in the region of interest when the target is located in the region of interest.

The integrated controller may form an outermost boundary based on the state information of the roundabout, and sets the region of interest having a range from the vehicle to the outermost boundary.

The state information of the roundabout may be perimeter information of the roundabout, and the integrated controller may form the outermost boundary having an arc length as the perimeter of the roundabout from the perimeter information of the roundabout.

The integrated controller may analyze a trace of the information of the target location by combining the information of the target location, and may form the outermost boundary from a center of the vehicle toward the left with respect to the front-side of the vehicle based on the moving direction of the trace, or from the center of the vehicle toward the right with respect to the front-side of the vehicle based on the moving direction of the trace.

In accordance with another aspect of the present disclosure, an image sensor configured to be disposed on the vehicle to have a view to the outside of the vehicle and capture image data includes: the image data is used for recognizing a roundabout, obtaining a state information of the recognized roundabout, and setting a region of interest based on the state information of the roundabout, and the image data is used for obtaining location information of a target to control the vehicle based on the location information of the target in the region of interest.

BRIEF DESCRIPTION OF THE DRAWINGS

These and/or other aspects of the invention will become apparent and more readily appreciated from the following description of the embodiments, taken in conjunction with the accompanying drawings of which:

FIG. 9 is a flowchart illustrating an embodiment of a vehicle control method according to the present disclosure.

FIG. 10 is a flowchart illustrating another embodiment of a vehicle control method according to the present disclosure.

DETAILED DESCRIPTION

Some embodiments of the present disclosure are described in detail below with reference to exemplary drawings. In describing the components of the present disclosure, terms such as first, second, A, B, (a), and (b) may be used. These terms are only for distinguishing the components from other components, and the nature, order or sequence of the components are not limited by the terms. It will be understood that when an element is referred to as being "connected," or "coupled," to another element, it can be directly connected or coupled to the other element or intervening elements may be present.

Figure 1:
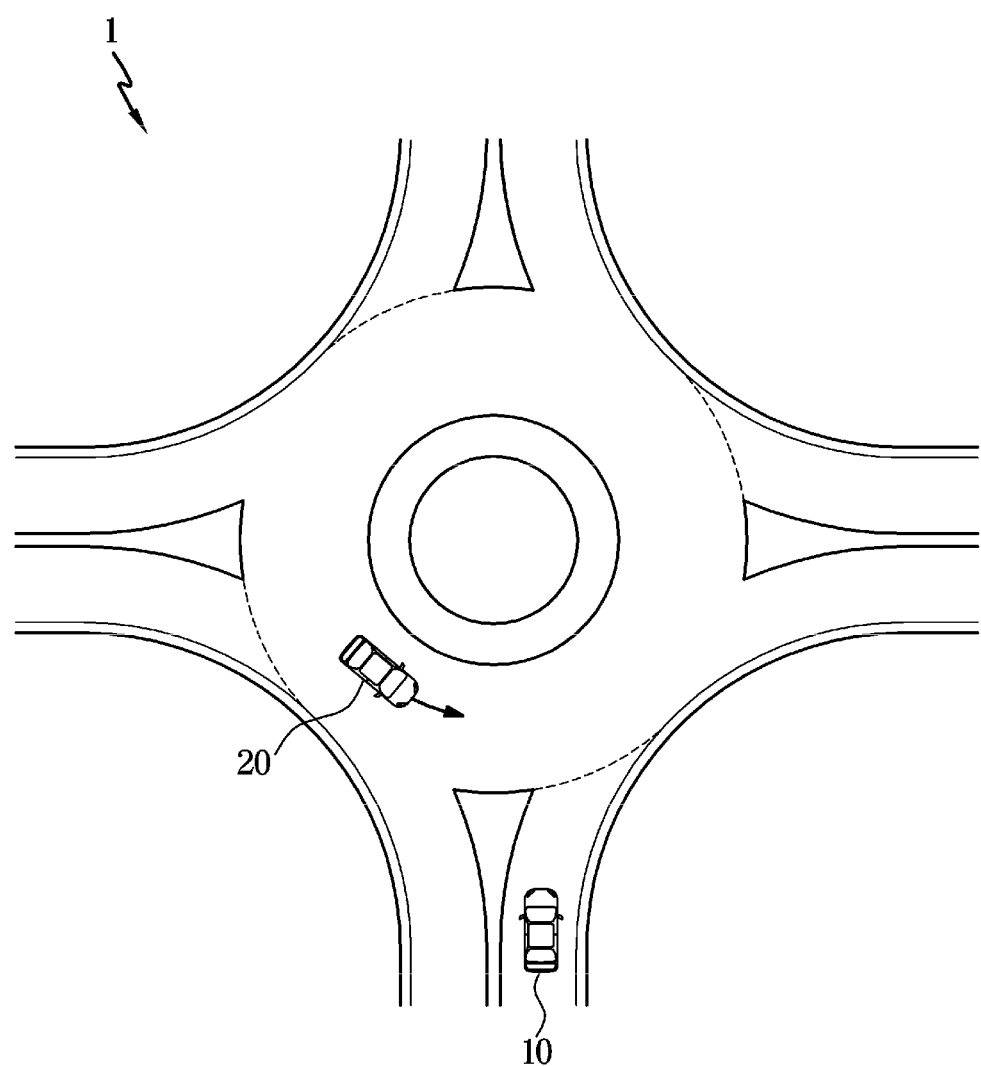
FIG. 1 is a view schematically illustrating a situation in which a vehicle capable of autonomous driving according to the present disclosure enters roundabout.

FIG. 1 is a view schematically illustrating a situation in which a vehicle 10 capable of autonomous driving according to the present disclosure enters roundabout 1.

Referring to FIG. 1, the vehicle 10 capable of autonomous driving according to the present disclosure may travel on various special roads. Here, the special road means a road such as a general intersection, a branch road, a one-way street, and the like with a traffic light.

Because special roads have a different structure than ordinary roads, the probability of a safety accident on a special road is higher than that of ordinary roads. Among the special roads, roundabout 1 has no traffic lights unlike general intersections, and one or more targets 20 enter the roundabout in a predetermined order, causing a congested traffic situation, thus increasing the probability of an accident.

In order to solve this problem, the present disclosure proposes to recognize roundabouts to detect targets and to enter roundabout 1 according to a positional relationship between the vehicle 10 and the targets.

Figure 2A:
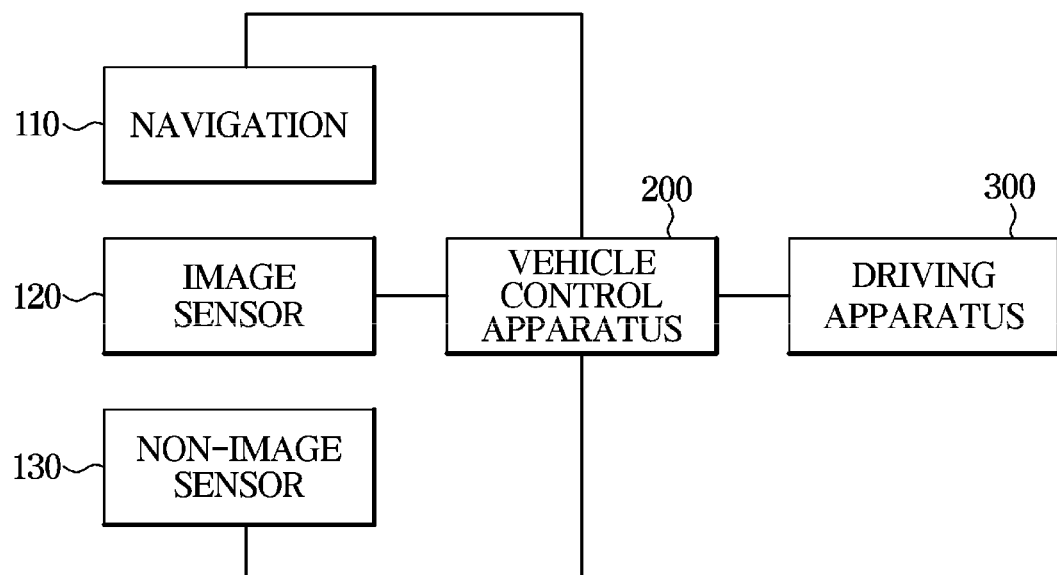
FIG. 2A is a configuration of a vehicle capable of autonomous driving according to an embodiment of present disclosure.
Figure 2B:
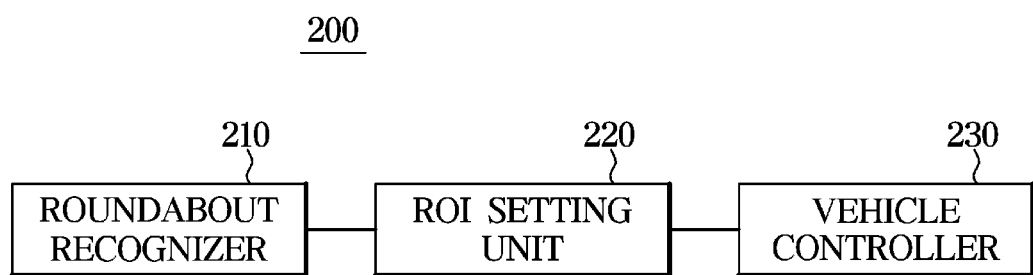
FIG. 2B is a configuration of a vehicle control apparatus according to an embodiment of present disclosure.

FIG. 2A is a configuration of a vehicle 10 capable of autonomous driving according to an embodiment of present disclosure, and FIG. 2B is a configuration of a vehicle control apparatus 200 according to an embodiment of present disclosure.

Referring to FIG. 2A, a vehicle 10 capable of autonomous driving according to the present disclosure includes a navigation 110, an image sensor (a first sensor) 120, a non-image sensor (a second sensor) 130, a vehicle control apparatus 200, and a driving apparatus 300.

The navigation 110 may provide location information, surrounding environment information, etc. obtained by communicating with a satellite through a GPS signal.

For example, the navigation 110 may provide location information of a vehicle including information about a location of the vehicle 10, and surrounding environment information including information about a surrounding environment, such as a structure and roads that exist around the vehicle 10 etc.

The image sensor (first sensor) 120 may be disposed in the vehicle to have a view of the outside of the vehicle. The at least one image sensor 120 may be mounted on each part of the vehicle to have a view of the front, the side, or the rear of the vehicle.

Since the image information captured by the image sensor 120 is composed of image data, it may mean image data captured by the image sensor 120. Hereinafter, in the present disclosure, image information captured by the image sensor 120 refers to image data captured by the image sensor 120.

The image data captured by the image sensor 120 may be generated, for example, in one of AVI, MPEG-4, H.264, DivX, and JPEG in raw form. Image data captured by the image sensor 120 may be processed by a processor.

The non-image sensor (second sensor) 130 may be disposed in the vehicle to have a sensing area with respect to the outside of the vehicle, and may capture sensing data. Examples of the plurality of non-image sensors include radar, lidar, and ultrasonic sensors.

For example, the camera disposed in front of the vehicle 10 may provide an image of the front region of the vehicle 10, and the corner radar disposed in the left side of the vehicle 10 may transmit a transmission signal toward the left side region of the vehicle 10 and receive the received signal to provide sensing data about an object.

The vehicle control apparatus 200 may receive information from the navigation 110, the image sensor (first sensor) 120, and the non-image sensor (second sensor) 130, and output a control signal.

The driving apparatus 300 may drive the vehicle 10 to move or stop by receiving a control signal, and may drive the vehicle 10 to perform an alarm operation by receiving the control signal. Accordingly, the driving apparatus 300 may include acceleration/deceleration device, a steering device, a braking device, and an alarm device. However, it is not limited thereto.

Referring to FIG. 2b, the vehicle control apparatus 200 according to the present disclosure may include roundabout recognizer 210, ROI setting unit 220, and vehicle controller 230.

The roundabout recognizer 210 may recognize the roundabout 1 based on information acquired by at least one of the image sensor 120 and the navigation 110.

That is, the roundabout recognizer 210 may recognize roundabout 1 using only the image sensor 120, or only the navigation 110, or both devices. A detailed embodiment thereof will be described with reference to FIG. 4.

When the roundabout 1 is recognized, the ROI setting unit 220 may form the outermost boundary based on the state information of the roundabout 1, and set a region of interest (ROI) in the range from the vehicle to the outermost boundary in front of the vehicle.

Here, the state information of roundabout 1 may include perimeter information about the perimeter of the round road included in roundabout 1, curvature information about the curvature of the round road, and the like.

Here, the outermost boundary is a boundary line extending in a direction away from the vehicle 10 and means a boundary for determining a range of the ROI.

Here, the ROI is an area set to determine a collision possibility with the vehicle 10 from one or more targets 20 located in the roundabout 1, and may be set to expand in the distance from the vehicle 10. However, it is not limited thereto.

The region of interest may be set on the sensing range of one or more target sensing sensors. For example, the ROI may be set within the detection range of the corner radar disposed in the left side of the vehicle 10. However, it is not limited thereto.

The vehicle controller 230 determines whether the one or more targets 20 are located in the set ROI based on the location information of the one or more targets 20 detected by the one or more target detection sensors, and controls the vehicle 10 based on the location information of targets in the ROI.

Here, the target 20 means a moving object which can be located in the roundabout 1. For example, the target 20 may include a vehicle, a motorcycle, a bicycle, and the like.

Here, the vehicle controller 230 may generate and output a control signal to control the vehicle 10 based on the location information of the target in the ROI.

On the other hand, the vehicle control apparatus 200 according to another present disclosure can be implemented as a controller capable of performing all the functions of the above-described configuration.

The controller may include at least one processor configured to process the image data captured by the image sensor.

The controller recognizes a roundabout based on the processing result of the image data, sets a region of interest in front of the vehicle based on a state information of the roundabout obtained from the processing result of the image data, determines a target located in the region of interest based on information of the target location based on the processing result of the image data, and controls the vehicle based on the information of the target location in the region of interest.

Such a controller is configured to control a vehicle's behavior by outputting a function of a processor for processing data and a generated control signal to the driving apparatus 300, and controlling to perform an ADAS function by communicating with an advanced driver assistance system (ADAS) module. It can be implemented as an integrated control unit (DCU: Domain Control Unit) that can be performed by integrating a function.

ADAS module has for example, a cruise control module for controlling the traveling speed of the vehicle such that the vehicle travels at the input target traveling speed, and emergency braking for controlling the braking device of the vehicle based on the degree of possibility of collision of the vehicle with an object etc.

Thus, the vehicle may run by processing the vehicle control system which includes an image sensor (first sensor) 120, an emergency braking module for controlling the braking device of the vehicle based on a degree of the possibility of the vehicle colliding with an object; and an integrated control unit (DCU) which processes the image data captured by the image sensor 120, determines the degree of collision with a target located in a roundabout, and generates and outputs information on the degree of collision possibility.

Here, the integrated control unit DCU may recognizes a roundabout based on the processing result of the image data, sets a region of interest in front of the vehicle based on a state information of the roundabout obtained from the processing result of the image data, determines a target located in the region of interest based on information of the target location based on the processing result of the image data, and determines the degree of the collision possibility with the vehicle and the target based on the location information of the target in the region of interest when the target is located in the region of interest. The integrated control unit DCU forms an outermost boundary based on the state information of the roundabout, and sets the region of interest having a range from the vehicle to the outermost boundary. The state information of the roundabout is perimeter information of the roundabout, and the integrated control unit forms the outermost boundary having an arc length as the perimeter of the roundabout from the perimeter information of the roundabout. The integrated control unit DCU analyzes a trace of the information of the target location by combining the information of the target location, and forms the outermost boundary from a center of the vehicle toward the left with respect to the front-side of the vehicle based on the moving direction of the trace, or from the center of the vehicle toward the right with respect to the front-side of the vehicle based on the moving direction of the trace.

Hereinafter, an embodiment of recognizing roundabout 1 of the vehicle control apparatus 200 according to the present disclosure will be described in detail.

Figure 3:
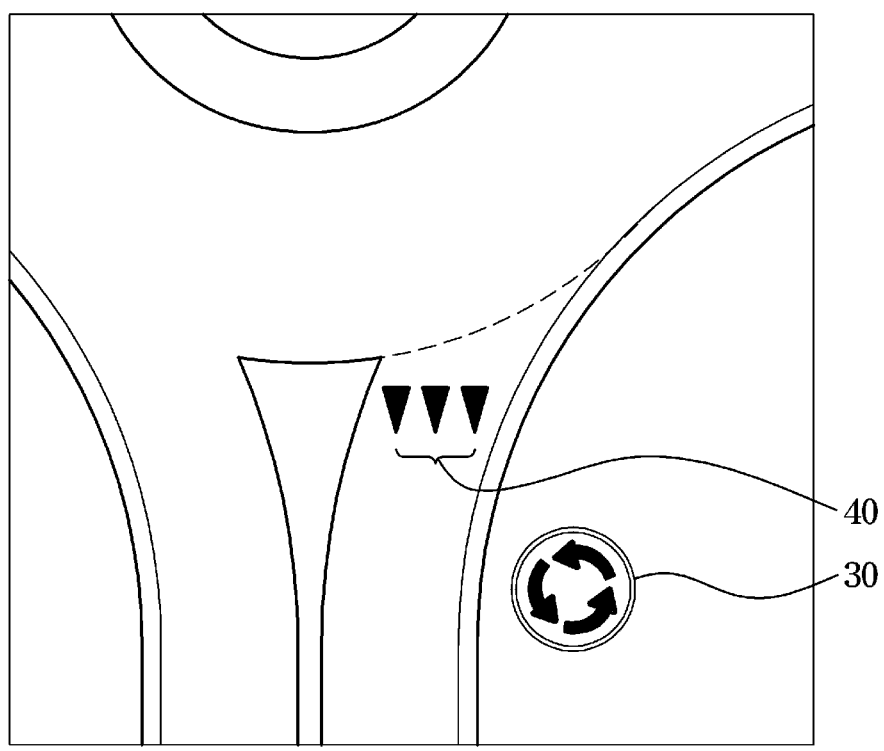
FIG. 3 is a view for explaining an embodiment in which the roundabout recognizer included in the vehicle control apparatus according to the present disclosure recognizes roundabout.

FIG. 3 is a view for explaining an embodiment in which the roundabout recognizer included in the vehicle control apparatus according to the present disclosure recognizes roundabout.

Referring to FIG. 3, the roundabout recognizer 210 included in the vehicle control apparatus 200 according to the present disclosure may recognize the roundabout 1 through the roundabout sign 30 and the triangular mark 40.

For example, the roundabout recognizer 210 receives an image from a camera capturing the front of the vehicle 10. The roundabout recognizer 210 extracts an image of the roundabout sign 30 from the input image using a region of interest (ROI) algorithm, and then recognizes roundabout 1 when the image of the roundabout sign 30 matches the pre-set roundabout image.

Here, the roundabout image is a form in which the arrows form a circle as indicated by the roundabout sign 30.

For example, the roundabout recognizer 210 receives an image from a camera capturing a road in front of the vehicle 10. The roundabout recognizer 210 extracts an image of the triangular mark 40 from the input image using a region of interest (ROI) algorithm, and then recognizes roundabout 1 when the image of the triangular mark 40 matches the preset triangular mark image. Here, the triangular mark image may be an image indicating roundabout 1.

Meanwhile, the roundabout recognizer 210 may recognize the roundabout 1 corresponding to the location information of the vehicle 10 currently driving by using the navigation 110.

For example, the roundabout recognizer 210 may receive the surrounding environment information at the position of the vehicle 10 from the navigation 110, extract the roundabout information included in the surrounding environment information, and recognize the roundabout 1.

As described above, the roundabout recognizer 210 may recognize the roundabout 1 using the camera or the navigation 110, but may recognize the roundabout 1 using both the camera and the navigation 110.

That is, the roundabout recognizer 210 may acquire all the information obtained by using the camera and the navigation 110 to recognize the roundabout 1, and may use the camera and the navigation 110 sequentially.

For example, the roundabout recognizer 210 first determines whether it is possible to recognize roundabout 1 using navigation. That is, the roundabout recognizer 210 receives the surrounding environment information at the position of the vehicle 10 from the navigation 110, extracts the roundabout information included in the surrounding environment information, and recognizes the roundabout 1.

If the roundabout 1 cannot be recognized by the surrounding environment information, the roundabout recognizer 210 receives an image from the camera and extracts an image included in the image to recognize the roundabout. Here, the image means a roundabout sign 30 and a triangular mark 40.

Here, when the roundabout 1 is recognized, the vehicle controller 230 may first perform at least one of a deceleration control for decelerating the vehicle 10 and a braking control for braking the vehicle 10.

That is, when the roundabout 1 is recognized, the vehicle controller 230 may generate a control signal corresponding to at least one of the deceleration and the braking control and transmit the generated control signal to the driving apparatus 300.

Once the roundabout recognizer 210 recognizes roundabout 1, it is necessary to determine the collision possibility with the target 20 in order for the vehicle 10 to safely enter the roundabout 1.

Hereinafter, an embodiment of setting a region of interest for determining a collision possibility with the target 20 will be described.

Figure 4:
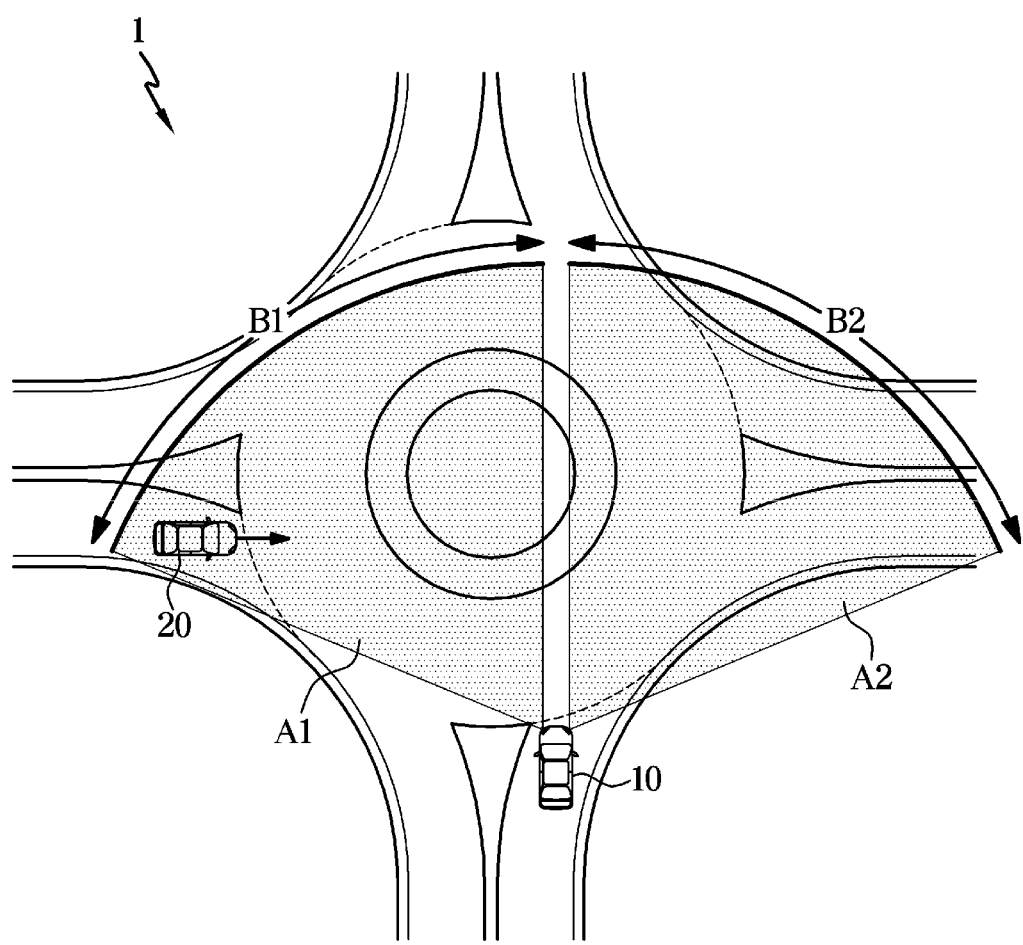
FIG. 4 is a view for explaining an embodiment in which the ROI setting unit included in the vehicle control apparatus according to the present disclosure sets the region of interest.

FIG. 4 is a view for explaining an embodiment in which the ROI setting unit included in the vehicle control apparatus according to the present disclosure sets the region of interest.

When the roundabout 1 is recognized, the vehicle 10 capable of autonomous driving according to the present disclosure may determine a collision possibility between the target 20 entering the roundabout 1 and the vehicle 10 to prevent a safety accident.

One means for determining the collision possibility is a method for detecting the position of the target 20 within the set area.

Referring to FIG. 4, for example, the ROI setting unit 220 included in the vehicle control apparatus 200 according to the present disclosure may include the first ROI A1 in the left side of the vehicle 10 with respect to the front side of the vehicle 10 and the second ROI A2 in the right side of the vehicle 10 with respect to the front side of the vehicle 10.

Meanwhile, the ROI setting unit 220 may set the ROI in the direction of high collision possibility according to the traffic direction in the roundabout 1 to prevent the collision more safely.

The direction of traffic in roundabout 1 may be determined by the direction of traffic defined for each country. For example, countries traveling on the left (UK, Australia, Japan, etc.) pass clockwise within roundabout 1, and countries traveling on the right (Korea, USA, etc.) pass counterclockwise within roundabout 1.

Therefore, when the ROI setting unit 220 receives the current position information of the vehicle 10, the ROI setting unit 220 acquires the direction information regarding the direction of the one-way passage in the roundabout 1, so the region of interest can be set any one of the first ROI A1 and the second ROI A2.

For example, the roundabout recognizer 210 transmits the position information of the vehicle of the vehicle 10 acquired by the navigation 110 to the ROI setting unit 220, and ROI setting unit 220 forms the outermost boundary from a center of the vehicle toward the left with respect to the front-side of the vehicle based on the position information of the vehicle, or from the center of the vehicle toward the right with respect to the front-side of the vehicle based on the position information of the vehicle.

Specifically, the ROI setting unit 220 analyzes the location information of the vehicle and when the vehicle 10 is located on the right traffic road, the first ROI A1 may be set by forming the first outermost boundary B1 from the center of the vehicle 10 toward the left side with respect to the front side of the vehicle 10. On the contrary, the ROI setting unit 220 analyzes the location information of the vehicle and when the vehicle 10 is located on the left traffic road, the second ROI A2 may be set by forming the second outermost boundary B2 from the center of the vehicle 10 toward the left side with respect to the front side of the vehicle 10.

The ROI setting unit 220 may set an ROI of one of the first ROI A1 and the second ROI A2 based on the moving direction of the target 20 detected by the sensor 120 instead of the navigation 110.

For example, the ROI setting unit 220 receives position information of at least one target 20 detected by at least one radar sensor, analyzes the trace of the position information of the target, and forms the outermost boundary from a center of the vehicle toward the left with respect to the front-side of the vehicle based on the moving direction of the trace, or from the center of the vehicle toward the right with respect to the front-side of the vehicle based on the moving direction of the trace.

Specifically, the ROI setting unit 220 analyzes the traces of the tracks generated in correspondence with the target 20 by the radar sensor for a preset time, If the moving direction of the trace is counterclockwise, the first outermost boundary B1 is formed to set the first ROI A1. Otherwise, if the moving direction of the trace is clockwise, the ROI setting unit 220 forms the second outermost boundary B2 to set the second ROI A2.

Hereinafter, an embodiment of setting an ROI by forming an outermost boundary will be described. For convenience, the first region of interest A1 illustrated in FIG. 4 will be described, and unless otherwise stated, the first region of interest A1 and the first outermost boundary B1 will be described as the region of interest A and the outermost boundary B, respectively.

Figure 5:
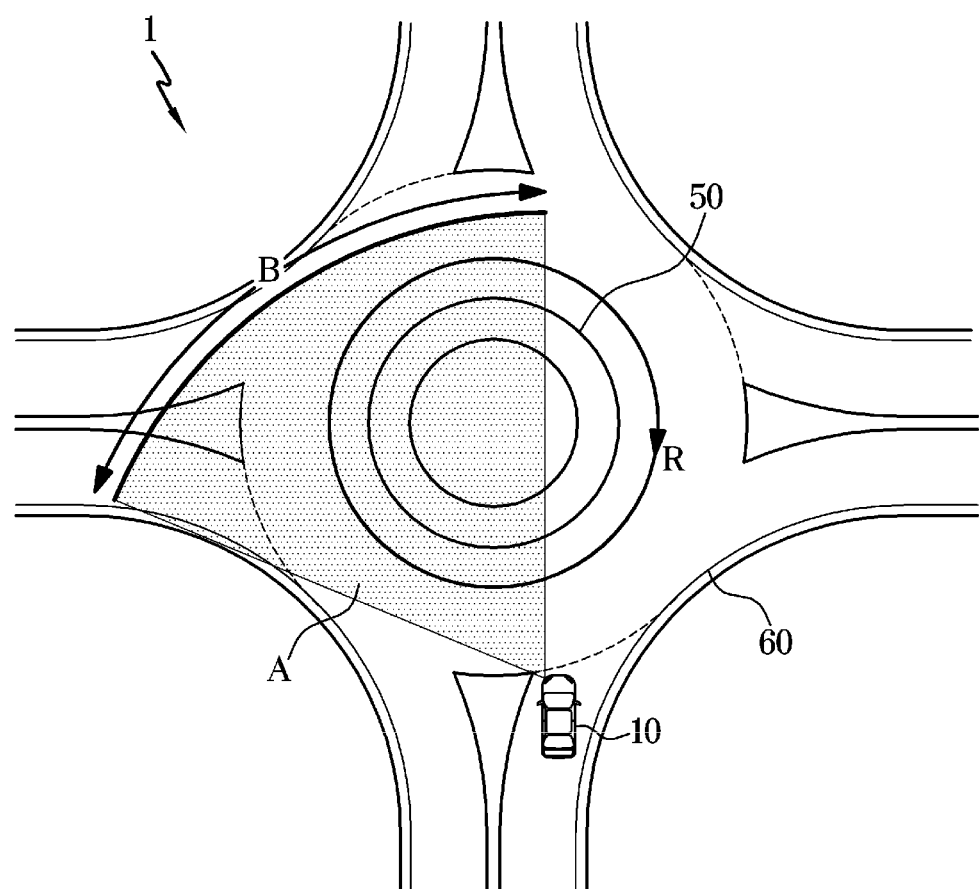
FIG. 5 is a view for explaining another embodiment in which the ROI setting unit included in the vehicle control apparatus according to the present disclosure sets the region of interest.

FIG. 5 is a view for explaining another embodiment in which the ROI setting unit included in the vehicle control apparatus according to the present disclosure sets the region of interest.

Referring to FIG. 5, the ROI setting unit 220 included in the vehicle control apparatus 200 according to the present disclosure forms the outermost boundary B using the perimeter information, the curvature information, and the like of the roundabout 1 to set the range of the region of interest A.

Here, state information such as perimeter information and curvature information of the roundabout 1 may be generated from the navigation 110 and the sensor 120.

For example, the roundabout recognizer 210 extracts the roundabout information included in the surrounding environment information at the location of the vehicle 10 received from the navigation 110 and transmits the roundabout information to the ROI setting unit 220. The ROI setting unit 220 extracts the perimeter information of roundabout 1 from the roundabout information to form the outermost boundary B having the perimeter R as the length of the arc.

Meanwhile, the roundabout recognizer 210 cannot recognize the roundabout 1 using the navigation 110 because there is no navigation or a failure, but the camera may recognize the roundabout 1.

In this case, the ROI setting unit 220 cannot receive the above roundabout information and extract the perimeter information. The outermost boundary B may be formed using average perimeter information on the average perimeter obtained by averaging the circumference R of general roundabouts, or the structure of roundabout 1. Here, the average perimeter information may be information obtained through simulation and algorithm. However, it is not limited thereto.

For example, if the ROI setting unit 220 does not recognize the roundabout 1 by the navigation 110, the ROI setting unit 220 extracts the average roundabout information of the roundabout 1 stored in advance and forms the outermost boundary B having the average perimeter as the length of the arc.

In another example, the ROI setting unit 220 detects the traffic island 50, which is a circular structure formed at the center of the roundabout 1 by the sensor 120, and the outer lane 60 in the roundabout 1, respectively, and calculates the respective curvatures. From each curvature, calculate the radius of the traffic island 50 and the radius of the outer lane 60 to calculate the average value of the radius, and the average perimeter is calculated using the average value to form the outermost boundary B having the average perimeter as the length of the arc.

Hereinafter, an embodiment of setting the ROI to specifically determine the degree of collision possibility between the vehicle 10 and the target 20 will be described. For convenience, the first region of interest A1 illustrated in FIG. 4 will be described, and unless otherwise stated, the first region of interest A1 and the first outermost boundary B1 will be described as the region of interest A and the outermost boundary B, respectively.

Figure 6:
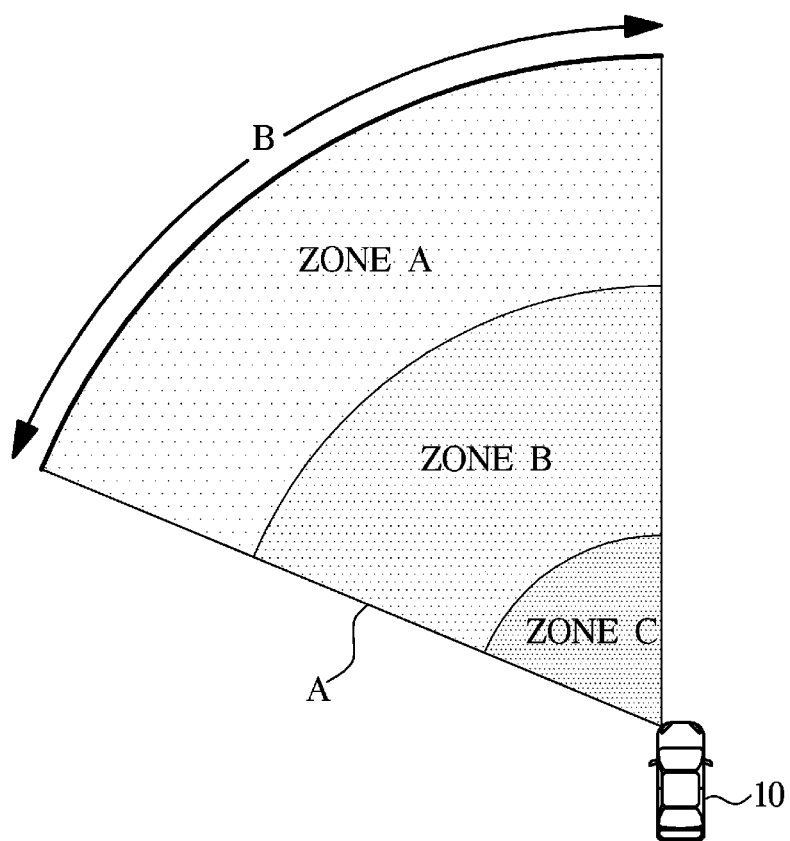
FIG. 6 is a view for explaining the other embodiment in which the ROI setting unit included in the vehicle control apparatus according to the present disclosure sets the region of interest.

FIG. 6 is a view for explaining the other embodiment in which the ROI setting unit included in the vehicle control apparatus according to the present disclosure sets the region of interest.

Referring to FIG. 6, the ROI setting unit 220 included in the vehicle control apparatus 200 according to the present disclosure divides the region from the vehicle 10 to the outermost boundary B into two or more zones according to the distance to set the ROI A.

When the ROI setting unit 220 divides the ROI setting unit into two or more zones and sets the ROI A, the vehicle controller 230 determines which one of the two or more zones the target 20 is located in and controls the preset vehicle control for each of the two or more zones.

Here, in the vehicle control, the control intensity may be set higher as the area approaches the vehicle 10.

For example, when the target 20 is located in the zone A, the vehicle controller 230 may generate and output a control signal to control the behavior of the vehicle 10 to allow the vehicle 10 to enter.

For another example, when the target 20 is located in the zone B, the vehicle controller 230 may display an alarm through a display, an instrument panel, etc. disposed in the vehicle 10, and the control signal may be generated and output to generate an alarm sound to inform the driver.

For another example, when the target 20 is located in the zone C, the vehicle controller 230 may generate and output a control signal to force brake the vehicle 10.

For another example, as the target 20 moves from zone A to zone C, the vehicle controller 230 may generate and output a plurality of control signals to do overlapped control operations corresponding to the zone.

Hereinafter, an embodiment in which the vehicle 10 is controlled in the situation of entering roundabout 1 by applying the embodiment of recognizing the roundabout 1 and setting the ROI A will be described.

Figure 7:
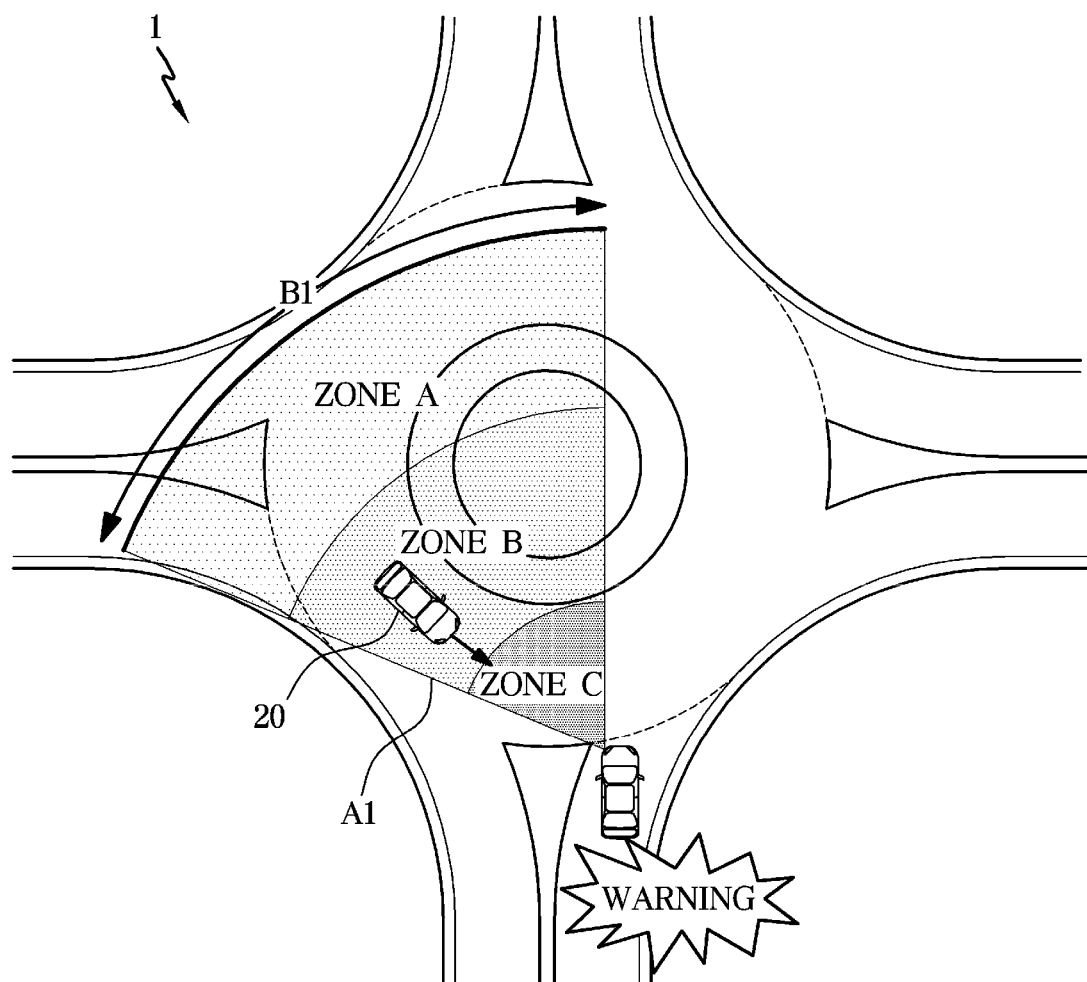
FIG. 7 is a view for explaining an embodiment of controlling a vehicle capable of autonomous driving according to the present disclosure according to a target located in a region of interest.

FIG. 7 is a view for explaining an embodiment of controlling a vehicle capable of autonomous driving according to the present disclosure according to a target located in a region of interest.

Referring to FIG. 7, the vehicle 10 capable of autonomous driving according to the present disclosure may recognize roundabout 1 existing in front of the vehicle 10 while driving.

For example, the vehicle 10 receives surrounding environment information from the navigation 110, extracts roundabout information included in the surrounding environment information, and recognizes roundabout 1 existing in front of the vehicle 10.

As another example, when the vehicle 10 cannot recognize roundabout 1 from the navigation 110, the vehicle 10 extracts an image of the roundabout sign 30 included in the image acquired by the camera to recognize roundabout 1.

If the vehicle 10 recognizes roundabout 1, the vehicle 10 may first brake before entering roundabout 1.

If the vehicle 10 stops before entering roundabout 1, the vehicle 10 may set the first RO1 A1 based on the state information of roundabout 1.

For example, the vehicle 10 analyzes the position information of the vehicle 10 to determine that the current vehicle 10 is located on the right side road, and forms a first outermost boundary B1 corresponding to the right side road and sets a first ROI A1.

After the vehicle 10 sets the first ROI A1, the vehicle 10 detects the target 20 that has entered roundabout. When the target 20 is located in the ROI, the vehicle 10 may emit an alarm sound or force brake according to the position of the target 20 in the first ROI.

For example, when the position of the target 20 in the first region of interest A1 is included in the zone B, the vehicle 10 emits an alarm sound to inform the driver.

When the target 20 is out of the first region of interest A1, the vehicle 10 may autonomously drive to enter roundabout 1.

Also, when two or more targets are located in the first ROI A1, the vehicle 10 may autonomously drive to enter roundabout 1 based on driving information of each of the two or more targets.

Here, the driving information may be location information of the target, relative speed information of each of the two or more targets for the vehicle 10, and distance information on a curved road between the two or more targets.

For example, when the target 20 is out of the first region of interest A1, the vehicle 10 releases forced braking and then enters roundabout 1.

Figure 8:
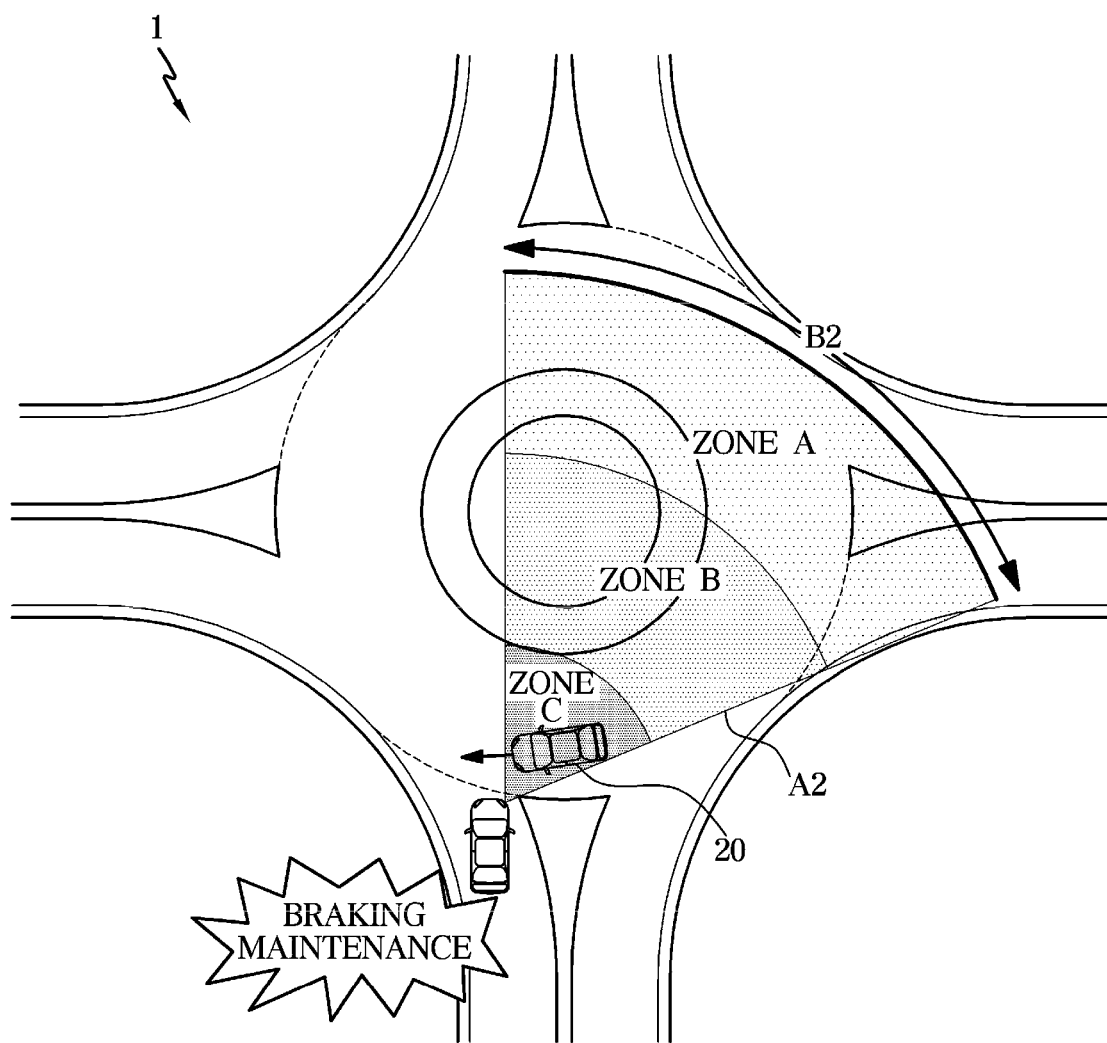
FIG. 8 is a view for explaining another embodiment of controlling a vehicle capable of autonomous driving according to the present disclosure according to a target located in a region of interest.

FIG. 8 is a view for explaining another embodiment of controlling a vehicle capable of autonomous driving according to the present disclosure according to a target located in a region of interest.

Referring to FIG. 8, the vehicle 10 capable of autonomous driving according to the present disclosure may recognize roundabout 1 existing in front of the vehicle 10 while driving.

For example, the vehicle 10 first determines whether to recognize roundabout 1 using the navigation 110, If the roundabout 1 cannot be recognized using the navigation 110, Roundabout 1 is recognized by extracting an image of the roundabout sign 30 included in the image acquired by the camera.

If the vehicle 10 recognizes roundabout 1, the vehicle 10 may first brake before entering roundabout 1.

When the vehicle 10 stops, the vehicle 10 may set the second region of interest A2, detect the target 20 that has entered roundabout, and determine whether the target 20 is located in the second region of interest A2.

For example, the vehicle 10 analyzes the location information of the vehicle 10 and determines that the current vehicle 10 is located on the left side road, and forms the second ROI A2 by forming a second outermost boundary B2 corresponding to the left traffic road, and detects the target 20 to determine whether the target 20 is located in the second ROI A2.

When the target 20 is located in the second region of interest A2, the vehicle 10 may emit an alarm sound or force brake according to the position of the target 20 in the second region of interest A2.

For example, when the position of the target 20 in the second region of interest A2 is included in the zone C, the vehicle 10 maintains braking.

When the target 20 is out of the second region of interest A2, the vehicle 10 may autonomously drive to enter roundabout 1.

Hereinafter, a vehicle control method capable of carrying out the present disclosure will be described.

FIG. 9 is a flowchart illustrating an embodiment of a vehicle control method according to the present disclosure.

Referring to FIG. 9, the vehicle control method according to the present disclosure includes recognizing roundabout based on information acquired by at least one of the image sensor (first sensor) and the navigation 110 (S910); when the roundabout is recognized, forming the outermost boundary based on the state information of the roundabout, and setting the ROI in front of the vehicle in a region of interest ranging from the vehicle to the outermost boundary (S920); and determining whether one or more targets are located in a region of interest set based on position information of one or more targets acquired based on sensing data captured by the one or more non-image sensors (second sensor), and controlling the vehicle based on the information that determined position of one or more targets in the region of interest (S930).

Hereinafter, an embodiment of a vehicle control method according to the present disclosure will be described.

FIG. 10 is a flowchart illustrating another embodiment of a vehicle control method according to the present disclosure.

Referring to FIG. 10, the vehicle control method according to the present disclosure determines whether the roundabout is recognized using navigation (S1010).

If roundabout cannot be recognized by the navigation, the vehicle control method according to the present disclosure determines whether the roundabout sign can be extracted using the camera (S1020).

For example, the vehicle control method determines whether an image of a roundabout sign included in an image acquired by the camera can be extracted.

If roundabout is recognizable by the navigation or camera, the vehicle control method according to the present disclosure recognizes roundabout (S1030).

The vehicle control method according to the present disclosure recognizes roundabout, sets a region of interest (S1040), and detects whether a target exists in roundabout (S1050).

When it is detected that the target exists in roundabout, the vehicle control method according to the present disclosure determines whether the target is located within the set ROI (S1060).

If the target is located in the ROI, the vehicle control method according to the present disclosure performs control corresponding to the position of the target in the ROI (S1070).

As described above, according to the present disclosure, it is possible to provide a vehicle control apparatus, a vehicle control method, and a vehicle control system for minimizing collision possibility between vehicles in roundabout to safely enter roundabout.

Moreover, according to this indication, the vehicle control apparatus, the vehicle control method, and the vehicle control system which aim at the driving convenience by keeping traffic in roundabout smoothly can be provided.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

The description above and the accompanying drawings are merely illustrative of the technical spirit of the present disclosure, and a person of ordinary skill in the art to which the present disclosure pertains may combine the configurations without departing from the essential characteristics of the present disclosure. Various modifications and variations may be made, including separation, substitution, and alteration. Therefore, the embodiments disclosed in the present disclosure are not intended to limit the technical spirit of the present disclosure but to describe the present disclosure, and the scope of the technical spirit of the present disclosure is not limited by these embodiments. In other words, within the scope of the present disclosure, all of the components may be selectively operated in combination with one or more. The protection scope of the present disclosure should be interpreted by the following claims, and all technical ideas within the scope equivalent thereto shall be construed as being included in the scope of the present disclosure.

As described above, the present disclosure may provide a vehicle control device, a vehicle control method, and a vehicle control system that safely enters roundabout by minimizing the collision possibility between vehicles in roundabout.

Moreover, the present disclosure may provide a vehicle control device, a vehicle control method, and a vehicle control system which facilitate driving by maintaining traffic in roundabout smoothly.

What is claimed is:

1. A vehicle control apparatus comprising:
   a first sensor configured to be disposed on the vehicle to have a view to the outside of the vehicle and capture image data; and
   a controller including at least one processor to process the image data captured by the first sensor and configured to:
     recognize a roundabout based on the processing result of the image data,
     set a region of interest in front of the vehicle based on state information of the roundabout obtained from the processing result of the image data,
     form an outermost boundary based on the state information of the roundabout and set the region of interest having a range from the vehicle to the outermost boundary,
     determine a target located in the region of interest based on position information of the target based on the processing result of the image data, and
     control the vehicle based on the information of the target location in the region of interest.

2. The vehicle control apparatus according to claim 1, wherein
   the state information of the roundabout is a perimeter information of the roundabout, and
   the controller forms the outermost boundary having an arc length as the perimeter of the roundabout from the perimeter information of the roundabout.

3. The vehicle control apparatus according to claim 1, wherein
   the controller analyzes a trace of the position information of the target by combining the information of the target position, and forms the outermost boundary from a center of the vehicle toward the left with respect to the front-side of the vehicle based on the moving direction of the trace, or from the center of the vehicle toward the right with respect to the front-side of the vehicle based on the moving direction of the trace.

4. The vehicle control apparatus according to claim 1, wherein
   the controller sets the region of interest by dividing a range from the vehicle to the outermost boundary into two or more zones according to a distance, and performs a preset vehicle control for each of the two or more zones by determining which of the two or more zones the target is located.

5. The vehicle control apparatus according to claim 1, further comprising:
   a second sensor configured to be disposed on the vehicle to have a detection area for the outside of the vehicle, and
   wherein the controller further obtains the position information of the target based on the sensing data of the second sensor.

6. The vehicle control apparatus according to claim 1,
   the controller receives a surrounding environment information at the location of the vehicle from a navigation, recognizes the roundabout by extracting an information of the roundabout included in the surrounding environment information, and further recognizes the roundabout by receiving the image data and using the roundabout image by processing the image data when the roundabout is not recognizable from the surrounding environment information.

7. The vehicle control apparatus according to claim 6, wherein
   the controller extracts the perimeter information of the roundabout from the roundabout information and forms the outermost boundary having a perimeter as an arc length.

8. The vehicle control apparatus according to claim 6, wherein
   the controller forms the outermost boundary having a pre-set average perimeter as an arc length by extracting the pre-set average perimeter information of the roundabout when the roundabout is not recognizable from the surrounding environment information of the navigation.

9. The vehicle control apparatus according to claim 1, wherein
   the controller forms the outermost boundary from a center of the vehicle toward the left with respect to the front-side of the vehicle based on the position information of the vehicle received from the navigation, or from the center of the vehicle toward the right with respect to the front-side of the vehicle based on the position information of the vehicle received from the navigation.

10. The vehicle control apparatus according to claim 4, wherein
    the controller sets the control intensity higher as the zone approaches to the vehicle.

11. The vehicle control apparatus according to claim 1, wherein
    the controller performs at least one of a deceleration control for decelerating the vehicle and a braking control for braking the vehicle when the roundabout is recognized.

12. The vehicle control apparatus according to claim 1, wherein the controller controls a behavior of the vehicle to enter the roundabout when the target has escaped the region of interest.

13. A vehicle control system comprising:

a first sensor configured to be disposed on the vehicle to have a view to the outside of the vehicle and capture image data;

an emergency braking module configured to control the braking device based on a degree of a collision possibility with a target and the vehicle; and an integrated controller configured to:
 process the image data captured by the first sensor,
 determine the degree of the collision possibility with the target located on the roundabout,
 generate and output the information of the degree of the collision possibility, wherein
 recognize a roundabout based on the processing result of the image data,
 set a region of interest in front of the vehicle based on a state information of the roundabout obtained from the processing result of the image data,
 form an outermost boundary based on the state information of the roundabout, and set the region of interest having a range from the vehicle to the outermost boundary,
 determine a target located in the region of interest based on position information of the target based on the processing result of the image data, and
 determine the degree of the collision possibility with the vehicle and the target based on the position information of the target in the region of interest when the target is located in the region of interest.

14. The vehicle control system according to claim 13, wherein the state information of the roundabout is a perimeter information of the roundabout, and the integrated controller forms the outermost boundary having an arc length as the perimeter of the roundabout from the perimeter information of the roundabout.

15. The vehicle control system according to claim 13, wherein the integrated controller analyzes a trace of the position information of the target by combining the information of the target location, and forms the outermost boundary from a center of the vehicle toward the left with respect to the front-side of the vehicle based on the moving direction of the trace, or from the center of the vehicle toward the right with respect to the front-side of the vehicle based on the moving direction of the trace.

16. The vehicle control apparatus according to claim 1, wherein the first sensor includes an image sensor.

17. A vehicle control apparatus comprising:

a first sensor configured to be disposed on the vehicle to have a view to the outside of the vehicle and capture image data; and a controller including at least one processor to process the image data captured by the first sensor and configured to:
 recognize a roundabout based on the processing result of the image data,
 set a region of interest in front of the vehicle based on state information of the roundabout obtained from the processing result of the image data,
 determine a target located in the region of interest based on position information of the target based on the processing result of the image data, and
 control the vehicle based on the information of the target location in the region of interest, the controller is further configured to set the region of interest by dividing a range from the vehicle to the outermost boundary into two or more zones according to a distance, and to perform a preset vehicle control for each of the two or more zones by determining which of the two or more zones the target is located.

18. The vehicle control apparatus according to claim 17, wherein the controller performs at least one of a deceleration control for decelerating the vehicle and a braking control for braking the vehicle when the roundabout is recognized.

19. The vehicle control apparatus according to claim 18, wherein the controller controls a behavior of the vehicle to enter the roundabout when the target has escaped the region of interest.

* * * * *